United States Patent

[11] 3,617,575

| [72] | Inventor | Oscar T. Quimby<br>Colorain Township, Hamilton County, Ohio |
|---|---|---|
| [21] | Appl. No. | 13,224 |
| [22] | Filed | Feb. 5, 1970<br>Division of Ser. No. 602,161, Dec. 16, 1966, Pat. No. 3,551,339. |
| [45] | Patented | Nov. 2, 1971 |
| [73] | Assignee | The Procter & Gamble Company<br>Cincinnati, Ohio |

[54] PROCESS OF TREATING AQUEOUS SOLUTIONS WITH AN ETHANE TRIPHOSPHONIC ACID COMPOUND
2 Claims, No Drawings

[52] U.S. Cl.............................................. 210/58, 260/502.4, 252/180

[51] Int. Cl............................................... C02b 5/06
[50] Field of Search............................. 260/502.4 P; 210/58; 252/180

[56] References Cited
UNITED STATES PATENTS
3,351,558  11/1967  Zimmerer..................  252/138 X

*Primary Examiner*—Michael Rogers
*Attorneys*—Richard C Witte and Julius Filcik

ABSTRACT: Aqueous solutions containing polyvalent metal ions are treated by adding an effective amount of a sequestering ethane triphosphonic acid compound.

3,617,575

PROCESS OF TREATING AQUEOUS SOLUTIONS WITH AN ETHANE TRIPHOSPHONIC ACID COMPOUND

This is a division of application Ser. No. 602,161 filed Dec. 16, 1966, now U.S. Pat. No. 3,551,339.

This invention relates to and has among its objects new and useful organic compounds. More particularly, it relates to water-soluble triphnosphonates which are substituted ethane compounds having the following general formula:

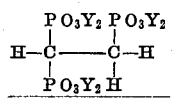

wherein Y is a substituent selected from the group consisting of hydrogen, sodium, potassium, ammonium, ammonium substituted with lower alkyl radicals containing less than seven carbon atoms and ammonium substituted with lower hydroxyalkyl radicals containing less than seven carbon atoms. In the form of the free acid a specific new compound is ethane-1,1,2-triphosphonic acid which has the following formula:

$$H_2O_3PCH_2CH(PO_3H_2)_2$$

The acid may be neutralized to any desired degree using a base which gives a soluble salt and is in other respects desired. The particular base material used can and will vary and in itself, is not critical although sodium, potassium, ammonium, and low molecular weight substituted ammonium salts represent the preferred embodiments of the present invention as more fully described hereinafter.

A principal object of the present invention is to provide a novel class of organic compounds containing three phosphonic acid groups. A second important object of the invention predicated on the unexpected usefulness of these compounds as excellent builders is to provide outstandingly efficient built detergent compositions. Other objects will become apparent from the following detailed description of the present invention.

According to the present invention, the synthesis of these compounds can be accomplished in various ways. A useful process involves the alkylation of the carbanion of the tetraisopropyl ester of methylenediphosphonate (I) with diisopropyl bromomethanephosphonate (II), with the resulting formation of sodium bromide (III), and the desired substituted ethane compound of the type indicated above (IV). This reaction proceeds according to the following general equation:

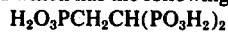

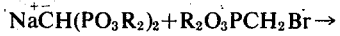

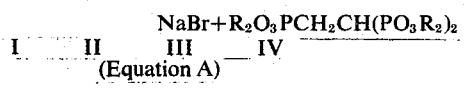

(Equation A)

The carbanion starting material (I) is readily obtained by an oxidation-reduction type of a reaction between a metallating agent such as sodium, sodium hydride, potassium, or potassium-sodium eutectic alloy, and a tetraalkyl ester of methylenediphosphonic acid, e.g., tetraisopropyl methylenediphosphonate. This reaction is highly exothermic and it is essential that it be conducted at low temperatures on the order of 0° to about 35° C., and preferably between 15° and 30° C. The reaction product is a carbanion derived from the active methylene grouping present in the parent methylene ester starting material. The equation for this step is as follows: (M represents one of the metallating agents such as those listed above).

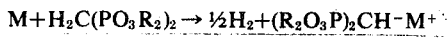

The resulting sodio or potassio carbanion derivative, for example, alkylates moderately readily with a phosphonomethyl alkylating agent such as diisopropyl bromomethanephosphonate, as in equation A above, yielding the corresponding triphosphonate ester which, if desired, can be hydrolyzed or pyrolyzed to the free acid. The free acid, in turn, can be neutralized to any degree desired with any ordinary base material. As it turns out, however, the tri-, tetra-, penta- and hexa-salts are the most easily separatable forms and this degree of neutralization is usually performed.

The alkylating agent, such as the diisopropyl bromoethanephosphonate (II), can be obtained by reaction of phosphorus tribromide, $PBr_3$, with formaldehyde, $CH_2O$, by known methods to make bromomethylphosphoryldibromide, $BrCH_2P(O)Br_2$; the desired diisopropyl bromomethanephosphonate, $BrCH_2PO_3R_2$, product is obtained from this acid bromide by reaction with isopropyl alcohol.

A suitable halogen containing alkylating agent can also be prepared by an Arbuzov rearrangement involving an excess of $CH_2X_2$, wherein X represents chlorine, bromine or iodine, according to the following equation:

$$CH_2X_2P(OR)_3 \rightarrow XCH_2PO_3R_2 + RX$$

In either case, the desired alkylating agent can be purified readily by known distillation techniques. Yet another method is a two step process beginning with formaldehyde and phosphorous trihalide, thus: (X can be either chlorine, bromine or iodine).

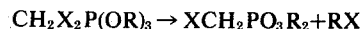

The reaction between the carbanion and the alkylating agent is conveniently carried out in the presence of an inert diluent or solvent, for example, toluene or other aromatic hydrocarbons. Saturated hydrocarbons or ethers may also be used but are less desirable because they dissolve very little of the carbanion.

The alkylating reaction requires a temperature in excess of about 70° and less than about 130° C. A preferred range within which to operate is from about 90° to about 130° C. The reaction requires from 30 minutes to about 5 hours, with a preferred operable range being from about 50 minutes to about 2.5 hours.

The following two experiments are typical examples for the preparation of the starting materials in equation A above. The first relates to the formation of the ester of tetraisopropyl methylenediphosphonate from which the carbanion is prepared and the second is a preparation of the diisopropyl bromomethanephosphonate alkylating agent.

TETRAISOPROPYL METHYLENEDIPHOSPHONATE

624.7 g. of triisopropyl phosphite (3 moles, 681 ml.) and 173.9 g. of dibromomethane (1 mole, 70 ml.) were combined in a reaction apparatus composed of a 1-liter, three-neck flask fitted with a magnetic stirrer a thermometer, and a fractionating column for separating the isopropyl bromide byproduct from the refluxing mixture. The fractionating column was constructed from a 36-inch Liebig condenser that had been modified to accommodate ¼-inch glass helices as packing. A Barrett distilling receiver, which had been modified by the addition of a thermometer well and thermometer was connected to the top of the fractionating column; and to the top of the Barrett receiver was fitted a Dewar condenser cooled with dry ice and protected from atmospheric moisture by a drying tube. The temperature of the reaction mixture was quickly brought to reflux at 143° C. The temperature of the circulating water in the packed reflux condenser was maintained at 65° C. This temperature was sufficient to return unreacted starting material and allow the byproduct isopropyl bromide to be distilled. The heat input to the reaction was such that vigorous refluxing continued as the temperature of the mixture slowly increased. After about 2 hours of heating the first distillate was observed, and after 5 hours a total of 33 g. of isopropyl bromide had been collected. The temperature of the reaction mixture was allowed to increase to 185° C. over a 12 hour period, and by means of an electronic temperature controller it was held there for the remainder of the reaction.

After approximately 16 hours, the reaction was essentially complete as judged by the yield of isopropyl bromide, 231 g. which represented a yield of about 92 percent. Further heating served no useful purpose and may cause partial pyrolysis to the free acid; however, longer reaction times can be used, if desired, when for any reason the acidification is a desired result.

When the reaction was complete, the reaction mixture was transferred to a distilling flask and the low boiling materials (excess phosphite, etc.) were removed through a short one-piece still under a vacuum of 0.1 mm. of mercury and heat temperatures up to 50° C. At this point the content of the flask weighed approximately 330 g. and was 93 percent to 95 percent tetraisopropyl methylenediphosphonate. The purity of this material was sufficient to proceed in the synthesis of the novel compounds of this invention.

If a purer product is desired, a high capacity vacuum pump can be introduced into the system and the pressure reduced to 0.005 mm. of mercury. The material boiling between 80° and 116° C. is collected and redistilled through an electrically heated 24-inch Vigreaux column. A complete example of this type of process is presented in a copending patent application, Ser. No. 218,862, filed Aug. 23, 1962, by Clarence H. Roy, now U.S. Pat. No. 3,251,907.

DIISOPROPYL BROMOMETHANEPHOSPHONATE

1738.35 g. of methylene bromide (10 moles) were combined with 1040.2 g. of triisopropyl phosphite (5 moles) and brought to reflux at 105° C. under a 24-inch Liebig column packed with glass helices. After the liquid had refluxed for 16 hours, the jacket temperature in the reflux condenser was raised from 18° to 63° C. so that the low boiling isopropyl bromide would be fractionated off as it was formed. A Barrett collector modified by the addition of a thermometer well (fitted with a thermometer) and another reflux condenser, this one with a jacket temperature of 18° C., was used to collect the isopropyl bromide. The reaction was continued until a total of 41 hours of heating time was reached, during which 62.5 percent, 384 g., of the theoretical amount of isopropyl bromide was collected.

The reaction was deliberately stopped at this point to prevent excessive reaction of the diisopropyl bromomethylphosphonate with the remaining triisopropyl phosphite to make tetraisopropyl methylenediphosphonate.

The excess and unreacted reagents were then removed by distillation at less than 60° C. with a vacuum of 5 mm. Hg. After a gross distillation of the remaining material, a refractionation through a 6-inch vacuum jacketed silvered column, packed with glass helices, gave 479.2 g. (yield=37 percent) of diisopropyl bromomethylphosphonate, b.p. 48° C. at 10 microns vacuum. This column was ideal for the refractionation, as the diisopropyl bromomethylphosphonate easily distills, while the higher boiling impurity of tetraisopropyl methylenediphosphonate can be distilled only with much more difficulty and at a much higher temperature. This being the case the 143 g. (0.415 moles) of diphosphonate were left undistilled.

The diisopropyl bromomethylphosphonate and tetraisopropyl methylenediphosphonate can be distinguished by their refractive indices and proton NMR spectra, but the $p^{31}$ NMR spectra cannot be used for identification of a mixture, as the chemical shifts (delta) for both compounds in the latter is the same, at -18 p.p.m. relative to 85 percent $H_3PO_4$ (external standard) as 0. The refractive index (at 25° C.) for methylenediphosphonate is 1.4318 compared to 1.4500 for bromomethylphosphonate, and the proton NMR spectrum of the diphosphonate gives a triplet at tau=7.8 p.p.m. (protons in tetramethylsilane set equal to 10.0 p.p.m.), J=20.1 c.p.s., compared to a doublet at tau=6.9 p.p.m., J=10 c.p.s., for bromomethylphosphonate.

Having described above typical methods for preparing the individual reactants, there is now presented a complete example covering the preparation of tetrasodium dihydrogen ethane-1,1,2-triphosphonate.

TETRASODIUM DIHYDROGEN ETHANE-1,1,2-TRIPHOSPHONATE

The reaction apparatus for this reaction consisted of a 1-liter, three-neck flask, fitted with a high speed stirrer (capable of 10,000 r.p.m.), a thermometer, a 50 ml. offset additive type separatory funnel, and an Allihn condenser. A 1,2-dimethoxyethane-dry ice bath was used to control the reaction as was needed.

19.55 g. of potassium (0.5 moles) and 150 ml. of toluene were placed in the reaction vessel, which had been dried by baking in an oven at 110° C. The mixture was heated to 70° C., and a potassium dispersion was made by stirring at 9,000 r.p.m. for 5 minutes, removing the heat and maintaining that speed until the temperature dropped below 50° C. The stirrer was slowed to give steady agitation while the temperature of the dispersion was dropped at 25° C. 172.17 g. of tetraisopropyl methylenediphosphonate (0.5 moles) were then added dropwise over a 40 minute period, while the reaction temperature was maintained at about 20°-25° C. by cooling with the dry ice bath. All of the potassium was thus consumed in the reaction. The reaction mixture was left stirring for 1 hour. 129.54 g. (0.5 moles) of diisopropyl bromomethanephosphonate was added dropwise to the reaction mixture. An immediate red-orange color developed, but no heat evolution or KBr precipitation was observed. The reaction mixture was cautiously heated, and as the temperature reached 110° C., exothermic reaction began to occur which was enough to raise the reaction temperature to 130° C. only momentarily. After the temperature began to drop, sufficient heat was applied to keep the reaction temperature at 110° C. for 2 hours. The solvent was then evaporated off and the residue dissolved in 200 ml. of water. This solution was placed in a liquid-liquid extractor and extracted for 20 hours with hexane. Evaporation of the water solution gave a white precipitate, filtered to give 78 percent of the theoretical amount of potassium bromide (analysis showed, 32.7 percent K, 65.7 percent Br, 0.9 percent $H_2O$). A small amount of gummy material remained in the concentrated filtrate. The hexane extract was dried with $MgSO_4$, concentrated and partially distilled through a short path column. The distillate was composed of a mixture of tetraisopropyl methylenediphosphonate and diisopropyl bromomethanephosphonate while the undistilled portion, 38.3 percent of the total reaction product contained 83 percent of hexaisopropyl ethane-1,1,2-triphosphonate (261.252 g.) making a 33.7 percent overall yield of the desired triphosphonate. The triphosphonate can be distinguished from the tetraisopropyl methylenediphosphonate and the diisopropyl bromomethanephosphonate by using the following data. Triphosphonate: $n^{25}_D$ 1.4430, $p^{31}$ NMR spectrum gives a peak p.p.m. with a chemical shift of −20.5 p.p.m. Methylenediphosphonate: $n^{25}_D$ 1.4318, $p^{31}$ NMR spectrum gives a triplet at tau = −18 p.p.m., proton NMR gives a triplet at tau = 7.8 p.p.m., J = 20 cps. Bromomethanephosphonate: $n^{25}_D$ 1.4500, $p^{31}$ NMR spectrum gives a peak at delta = −18 p.p.m., proton NMR gives a doublet at tau = 6.9 p.p.m., J = 10 c.p.s.

The undistilled portion, containing 83 percent triphosphonate, was converted to the free acid by refluxing for 5 hours with a 100 percent excess of concentrated HCl. The acidic solution was evaporated to a constant volume and azeotroped four times with n-propanol to remove traces of HCl before dissolving the residual phosphonic acid in water and titrating to the tetrasodium salt at a pH of 8.5 with four molar equivalents of NaOH. The salt was purified by recrystallization from methanol-water solution to give the final product.

Analytical: Calculated for $C_2H_5O_9P_3Na_4$: C, 6.71; H, 1.41; P, 25.96; Na, 25.69. Found C, 6.71; H, 1.35; P, 24.8; Na, 25.9.

Neutron Magnetic Resonance Spectra-$p^{31}$: A single broad peak at delta $= -21.0$ p.p.m.; $H^1$: Complex and unanalyzed set of peaks for $-CH_2CH<$ in the range of tau $= 7.1$ to 8.2 p.p.m. plus a sharp singlet at tau $= 4.96$ p.p.m. for POH.

The novel triphosphonate compounds of the present invention also can be prepared by another route. This alternative method avoids the making of methanediphosphonate as an intermediate. Instead, acetylenemonophosphonate is prepared by a reaction between monolithium acetylide (from $LiNH_2$) with chlorophosphate in a diethyl ether solvent:

$$HCCLi + ClPO_3R_2 \xrightarrow{Et_2O} LiCl + HCCPO_3R_2$$

This product is then converted to tetraisopropyl ethane-1,1,2-triphosphonate by reaction with diisopropyl hydrogen phosphite in the presence of catalytic amounts of an alkali metal derivative of the latter, e.g. sodium diisopropyl phosphite. This conversion proceeds according to the following equation:

$$HCCPO_3R_2 + 2HPO_3R_2 \rightarrow R_2O_3PCH_2CH(PO_3R_2)_2$$

As in the example above, the resulting ester can be readily hydrolyzed and neutralized by known methods.

In this alternative acetylenephosphonate route, any alkali metal can be used in the place of lithium and the alkyl group in the esters can be any low molecular weight alkyl radical containing four carbon atoms or less. The ethyl ether solvent can be replaced by other ethers or other nonprotonating unreactive solvents.

Especially valuable and preferred compounds which can be prepared according to the present invention using the methods described above are:

trisodium trihydrogen ethane-1,1,2-triphosphonate $Na_3H_3[O_3PCH_2CH(PO_3)_2]$ tetrasodium dihydrogen ethane-1,1,2-triphosphonate $Na_4H_2[ahO_3PCH_2CH(PO_3)_2]$ pentasodium hydrogen ethane-1,1,2-triphosphonate $Na_5H[OPCH_2CH(PO_3)_2]$ hexasodium ethane-1,1,2-triphosphonate $Na_6[O_3PCH_2CH(PO_3)_2]$ The corresponding potassium, ammonium and low molecular weight and substituted ammonium salts are equally valuable. With respect to the ammonium derivatives, the tri- and tetra-salts are the most readily prepared and are the preferred compounds of that particular group. Specific examples of useful substituted ammonium compounds in terms of the present invention are the following:

tris(tetramethylammonium)trihydrogen ethane-1,1,2-triphosphonate $[N^+(CH_3)_4]_3H_3[O_3PCH_2CH(PO_3)_2]$ tetrakis(tetraethylammonium) dihydrogen ethane-1,1,2-triphosphonate $[N^+(C_2H_5)_4]_3H_3[O_3PCH_2CH(PO_3)_2]$ Other lower alkyl radicals up to and including hexyl can be used to replace the methyl and ethyl radicals in the preceding formulas.

Specific examples of useful forms of ammonium derivatives substituted with lower hydroxyalkyl radicals containing less than seven carbon atoms are the following:

tris(triethanolammonium)trihydrogen ethane-1,1,2-triphosphonate $[HN(CH_2CH_2OH)_3]_3H_3[O_3PCH_2CH(PO_3)_2]$ tetrakis(monethanolammonium)dihydrogen ethane-1,1,2-triphosphonate $[H_3N(CH_2CH_2OH)]_4H_2[O_3PCH_2CH(PO_3)_2]$ A peculiarly outstanding and surprising characteristic common to all of the new triphosphonate compounds of the present invention involves their remarkable sequestering properties. It has been discovered that these compounds possess the capacity of complexing in excess of two moles of calcium per mole of sequestrant. As a typical illustration, for example, data for the tetrasodium salt, $Na_4H_2[O_3PCH_2CH(PO_3)_2]$ is given below along with other compounds whose sequestering characteristics are more well known.

TABLE I

| Compound | Formula of free acid | Salt tested | Sequestering efficiency [1] Gram Ca/100 gram sequestrant (moles Ca/mole sequestrant*) | | | |
|---|---|---|---|---|---|---|
| | | | pH 9 | pH 10 | pH 11 | pH 12 |
| Sodium ethane-1,1,2-triphosphonate | $(H_2O_3P)_2CHCH_2PO_3H_2$ | $Na_4$ | 1.9 (.17*) | 24.0 (2.15*) | 25.2 (2.26*) | 25.0 (2.24*) |
| Sodium tripolyphosphate | $H_5P_3O_{10}$ | $Na_5$ | 7.5 (0.69) | 8.1 (0.75) | 7.9 (0.73) | 6.6 (0.61) |
| Sodium pyrophosphate | $H_4P_2O_7$ | $Na_4$ | 2.7 (0.18) | 4.6 (0.31) | 5.0 (0.33) | 4.0 (0.27) |
| Sodium nitrilotriacetate | $N(CH_2COOH)_3$ | $Na_3$ | 11.4 (0.73) | 13.4 (0.86) | 13.6 (0.87) | 13.2 (0.85) |
| Sodium ethylene diamine tetraacetate | $[CH_2N(CH_2COOH)_2]_2$ | $Na_4$ | 10.2 (0.97) | 10.2 (0.97) | 10.1 (0.96) | 10.1 (0.96) |

[1] As determined by a slightly modified version of a standardized testing method as published in the Journal of Physical Chemistry 64, 1398 (1969): "Metal Complexing by Phosphorous Compounds. I. The Thermodynamics of Association of Linear Polyphosphates with Calcium" by R. R. Irani and C. F. Callis.

*It especially will be noted that at pH of 10, 11 and 12 the sodium ethane-1,1,2-triphosphonate compound has sequestered more than two moles of calcium per mole of the triphosphonate used in the test. The only change in the published procedure is in the substitution of caprate compounds for oxalate compounds.

This amount is far in excess of the moles of calcium sequestered by the other compounds tested. This is all the more surprising in view of the fact that the four compounds selected for comparison are all reputedly know sequestrants which are commonly recommended for sequestering applications. The compounds of this invention can be usefully substituted in place of these other materials n all analytical, biological, physiological and industrial applications which are well documented, as for instance, in the text entitled. "Organic Sequestering Agents" written by Chaberek and Martell, copyright 1959.

This discovery of the remarkable sequestering properties of the triphosphonate compounds described herein now makes possible an efficient process for treating aqueous solutions containing metal ions, particularly polyvalent metal ions such as calcium, iron, magnesium, zinc and copper, and the like. In many industrial, institutional and household processes and products, metal ion contaminates present in water may adversely affect color, stability, appearance, quality and saleability of a product or the efficiency of a process. The role of a sequestrant or complexing agent in helping to overcome such adverse affects of metal ions is fairly well recognized and appreciated. There is a continuing need, however, for new compounds which offer superior results.

Therefore, it is another embodiment of the present invention to provide a highly improved process for treating aqueous solutions containing polyvalent metal ions which comprises adding to the solution an effective amount of an ethane-1,1,2-triphosphonate compound of the type described herein. Ordinarily, this amount should range from about 0.25 p.p.m. to 10,000 p.p.m. of the aqueous solution. This aspect of the present invention is based on the discovery of the outstanding sequestering properties of the novel triphosphonate compounds of the present invention.

It has been generally recognized that sequestering agents such as amino acid sequestrants including nitrilotriacetic acid and EDTA react with polyvalent ions on a mole-to-mole basis. The relative efficiency of sequestrants is related to their molecular weight. By this criteria, the ethane triphosphonate compounds of the present invention are, in the order of magnitude, about three to four times as efficient as sodium tripolyphosphate. This is evident from the information presented in table I above.

As a result of this discovery, it is possible to employ only a fraction of a mole of an ethane triphosphonate compound to sequester or complex as much of a metal ion in aqueous solution as it takes a whole mole of sodium tripolyphosphate to do. In other words, the ethane triphosphonate compounds of the present invention provide an efficiency improvement of considerable magnitude.

In addition to the marked efficiency of the ethane triphosphonate compounds as evidenced, for example, in table I, there is another noteworthy feature that distinguishes the present invention from previously-known sequestrant compounds. It has been discovered that a complex formed between a polyvalent ion such as calcium and a triphosphonate sequestrant as described herein occurs in a molar ratio of calcium to triphosphonate on the order of about 2:1. Thus, each mole of sodium ethane-1,1,2-triphosphonate complexes about two moles of calcium per mole of triphosphonate. More conventional sequestrants such as sodium tripolyphosphate (STP) and EDTA tend to form complexes in a 1:1 molar ratio.

Another distinguishing and valuable characteristic of the sequestering properties of the triphosphonate compounds is the strength of the metal ion complex which is formed. The calcium or other polyvalent metal is very tightly bound.

Based on the outstanding sequestering properties of the ethane triphosphonate of the present invention, there is provided an improved process for treating aqueous solutions containing polyvalent metal ions which comprises adding to said solution an effective amount of a triphosphonate compound. Specific applications of such a process include the softening of water since the ethane triphosphonate compounds form tight complexes with the metal ions which impart hardness to the aqueous solution, e.g., calcium, iron, copper, magnesium ions and the like. In such a process, as has been pointed out above, it is not necessary to add stoichiometric quantities of the sequestrant, since the use of less than stoichiometric amounts effectively retards or inhibits calcite formation.

Further applications are also apparent from the foregoing description of the invention. Among these are descaling of textiles in which alkaline earth metal salts have been deposited; the lessening of the ash content in fabrics which have been treated with soap or pyrophosphate containing washing agents; in cleaning processes such as in the washing of bottles in which precipitation of calcite is avoided by adding to the washing solution effective amounts of a triphosphonate sequestrant.

The ethane triphosphonates are also suitable as additives to dyebaths for textiles, in which they form complexes with metal ions which would otherwise produce undesired shades of color. Yet further applications include agricultural uses such as making up concentrates of herbicides and plant treating compositions; photographic uses in which hard water elements are responsible for sludges and turbidity in developing and fixing solutions; industrial cleaning situations in which scales and sludges are formed, such as hard water scale, milk stone, beer stone, metal soaps, floor cleaning compounds, boiler and evaporator scales, and sugar evaporator scales. In textile finishing and dyeing, the sequestrants of the present invention can be used in conjunction with bleaching and brightening steps, and desizing and dyeing baths.

The ethane triphosphonate compounds of the present invention are also also useful as additives to synthetic rubber; in tanning processes; rare earth separations; as well as in pharmaceuticals. Still other valuable uses of sequestrants are found in the literature including a text entitled "Organic Sequestering Agents" written by S. Chaberek and A. Martell, published in 1959 by John Wiley & Sons, Inc. New York, N.Y.

The foregoing discussion has indicated that ethane triphosphonate compounds, as described herein, are useful as builder compounds and also that they are useful as sequestrants. It should be noted that the builder activity of these compounds is not directly related to the sequestering ability of these same compounds. The builder properties are clearly demonstrable, even if distilled water is used exclusively in detergency tests. Moreover, there is no predictable correlation between relative performances of sequestrants and detergent builders. Some highly efficient sequestrants are inferior as builders, while some less efficient sequestrants are very valuable as builder compounds.

As mentioned previously, one of the most important objects of the present invention is to combine detergent compounds with the compounds of the present invention in order to prepare highly useful built detergent compositions. No one prior to this invention has employed the particular combination of builder and detergent compounds in the specific and preferred proportions described herein. The result is a built detergent composition that offers as advantages stability against deterioration during storage and use, high detergent power at remarkably low usage level, outstanding performance in hard water, as well as excellent whiteness and whiteness maintenance results. In addition, the built detergent compositions of the present invention perform equally well with either ordinary tap water which is at room temperature as well as with water which has been heated to temperatures on the order of 140°–160° F., and even higher.

These and other advantages are obtained according to this invention by providing detergent compositions consisting essentially of an organic detergent surfactant compound and, as a builder ingredient, an organic water soluble salt of one or a mixture of the new class of compounds identified above, the ratio by weight of the builder ingredient to the detergent surfactant compound being in the range of about 10:1 to about 1:3. The composition should provide at the usage level in solution a pH of between about 8 to about 12. The preferred ratio of said builder ingredient to said detergent surfactant compound is in the range of about 5:1 to about 1:2. The optimum pH range based on overall performance results is between 9 to 11. If the combination of the builder and detergent do not produce a pH in this range, alkaline compounds can be used to provide the necessary pH adjustment.

The concept underlying the use of certain compounds to aid in the detergency process and to boost, improve or build, as it has become to be known, the cleaning effectiveness of detergent compounds is well known. As detergency and cleaning in general is a tremendously complex and little understood phenomenon similarly the behavior of so-called builder compounds is also as yet unexplained. For this reason, no explanation is given herein for the unusually effective performances obtained with the compounds of this invention when employed as detergency builders. It is quite likely that one factor in the improved efficiency of the builder compounds presented by this invention is their excellent sequestering properties described above. It is well known, however, that numerous other factors involving both the chemical and physical characteristics go into the preparation of a superior performing built composition.

Among the many facets of built detergency systems in which builder materials are thought to have some effect are such factors as stabilization of solid soil suspensions, emulsification of soil particles, the surface activity of the aqueous detergent solution, solubilization of water-insoluble materials, foaming or suds producing characteristics of the washing solutions, peptization of soil agglomerates, neutralization of acid soil and sequestration of mineral constituents present in the washing solution tending to "harden" it.

Among the organic detergent surfactant compounds which can be successfully built by compounds prepared according to this invention are anionic, nonionic, ampholytic and zwitterionic detergent surfactants, and mixtures thereof.

a. The anionic organic detergents include both soap and nonsoap detergents.

Examples of suitable soaps are the sodium, potassium, ammonium and alkylolammonium salts of higher fatty acids ($C_{10}$–$C_0$). Particularly useful are the sodium and potassium salts of the mixtures of fatty acids derived from coconut oil and tallow, i.e., sodium or potassium tallow and coconut soap.

The nonsoap anionic synthetic detergents can be broadly described as the water soluble salts, particularly the alkali metal salts, of organic sulfuric reaction products having in their molecular structure an alkyl radical containing from about eight to about 22 carbon atoms and a radical selected from the group consisting of sulfonic acid and sulfuric acid ester radicals. (Included in the term alkyl are higher acyl radicals.) Important examples of the synthetic detergents which form a part of the preferred compositions of the present invention are the sodium alkyl sulfates, especially those obtained by sulfating the higher alcohols ($C_8$–$C_{18}$ carbon atoms) produced by reducing the glycerides of tallow or coconut oil; sodium or potassium alkylbenzenesulfonates in which the alkyl group contains from about nine to about 15 carbon atoms, especially those of the types described in U.S. Pat. Nos. 2,220,099 and 2,477,383; sodium alkylglycerylethersulfonates, especially those ethers of the higher alcohols derived from tallow and coconut oil; sodium coconut oil fatty acid monoglyceride sulfates and sulfonates; sodium or potassium salts of sulfuric acid esters of the reaction product of one mole of a higher fatty alcohol (e.g. tallow or coconut oil alcohols) and about 1 to 6 moles of ethylene oxide; sodium or potassium salts of alkylphenol ethylene oxide ether sulfates with about one to 10 units of ethylene oxide per molecule and in which the alkyl radicals contain about nine to about 12 carbon atoms; the reaction product of fatty acids esterified with isethionic acid and neutralized with sodium hydroxide, where, for example, the fatty acids are derived from coconut oil; sodium or potassium salts of fatty acid amide of a methyltauride in which the fatty acids, for example, are derived from coconut oil, and others known in the prior art, a number being specifically set forth in U.S. Pat. Nos. 2,486,921, 2,486,922, and 2,386,278.

b. Nonionic synthetic detergents: This class of synthetic detergents may be broadly defined as compounds aliphatic or alkyl aromatic in nature which do not ionize in water solution.

For example, a well-known class of nonionic synthetic detergents is made available on the market under the trade name of "Pluronic." These compounds are formed by condensing ethylene oxide with a hydrophobic base formed by the condensation of propylene oxide with propylene glycol. The hydrophobic portion of the molecule which, of course, exhibits water insolubility has a molecular weight of from about 1,200 to 2,500. The addition of polyoxyethylene radicals to this hydrophobic portion tends to increase the water solubility of the molecule as a whole and the liquid character of the product is retained up to the point where polyoxyethylene content is about 50 percent of the total weight of the condensation product.

Other suitable nonionic synthetic detergents include:

1. The polyethylene oxide condensates of alkylphenols, e.g., the condensation products of alkylphenols or dialkylphenols wherein the alkyl group contains from about six to 12 carbon atoms in either a straight chain or branched chain configuration, with ethylene oxide, said ethylene oxide being present in amounts equal to 8 to 25 moles of ethylene oxide per mole of alkylphenol. The alkyl substituent in such compounds may be derived from polymerized propylene, diisobutylene, n-octene, or n-nonene, for example.

2. Those nonionic compounds derived from the condensation of ethylene oxide with the product resulting from the reaction of propylene oxide and ethylenediamine. For example, compounds containing from about 40 to about 80 percent polyoxyethylene by weight and having a molecular weight of from about 5,000 to about 11,000 resulting from the reaction of ethylene oxide groups with a hydrophobic base constituted of the reaction product of ethylenediamine and excess propylene oxide, said base having a molecular weight on the order of 2,500 to 3,000, are satisfactory.

3. The condensation product of aliphatic alcohols having from eight to 18 carbon atoms, in either straight chain or branched chain configuration, with ethylene oxide, e.g., a coconut alcohol ethylene oxide condensation having from 10 to 30 moles of ethylene oxide per mole of coconut alcohol, the coconut alcohol fraction having from 10 to 14 carbon atoms.

4. Long chain tertiary amine oxides corresponding to the following general formula, $R_1R_2R_3N \rightarrow O$, wherein $R_1$ is an alkyl radical of from about eight to 18 carbon atoms, and $R_2$ and $R_3$ are each methyl or ethyl radicals. The arrow in the formula is a conventional representation of a semipolar bond. Examples of amine oxides suitable for use in this invention include dimethyldodecylamine oxide, dimethyloctylamine oxide, dimethyldecylamine oxide, dimethyltetradecylamine oxide, dimethylhexadecylamine oxide.

5. Long chain tertiary phosphine oxides corresponding to the following general formula $RR'R''P \rightarrow O$ wherein R is an alkyl, alkenyl or monohydroxyalkyl radical ranging from 10 to 18 carbon atoms in chain length and R' and R'' are each alkyl or monohydroxyalkyl groups containing from one to three carbon atoms. The arrow in the formula is a conventional representation of a semipolar bond. Examples of suitable phosphine oxides are:
dimethyldodecylphosphine oxide,
dimethyltetradecylphosphine oxide,
ethylmethyltetradecylphosphine oxide,
cetyldimethylphosphine oxide,
dimethylstearylphosphine oxide,
cetylethylpropylphosphine oxide,
diethyldodecylphosphine oxide,
diethyltetradecylphosphine oxide,
dipropyldodecylphosphine oxide,
bis-(hydroxymethyl)dodecylphosphine oxide,
bis-(2-hydroxyethyl)dodecylphosphine oxide,
(2-hydroxypropyl)methyltetradecylphosphine oxide,
dimethyloleylphosphine oxide, and
dimethyl-(2-hydroxydodecyl) phosphine oxide.

c. Ampholytic synthetic detergents: This class of synthetic detergents can be broadly described as derivatives of aliphatic amines which contain a long chain of about eight to 18 carbon atoms, and an anionic water solubilizing group, e.g. carboxy, sulfo, or sulfato. Examples of compounds falling within this definition are sodium-3-dodecylaminopropionate and sodium-3-dodecylaminopropanesulfonate.

d. Zwitterionic synthetic detergents: This class of synthetic detergents can be broadly described as derivatives of aliphatic quaternary ammonium compounds, in which the aliphatic radical may be straight chain or branched and wherein one of the aliphatic substituents contains from about eight to 18 carbon atoms and one contains an anionic water solubilizing group, e.g., carboxy, sulfo, or sulfato. Examples of compounds falling within this definition are 3-(N,N-dimethyl-N-hexadecylammonio)-propane-1-sulfonate and 3-(N,N-dimethyl-N-hexadecylammonio)-2-hydroxypropane-1-sulfonate.

The anionic, nonionic, ampholytic and zwitterionic detergent surfactants mentioned above can be used singly or in combination in the practice of the present invention, as in fact, the builder ingredient can be a single triphosphonate or a mixture of two or more of such compounds. The above listed examples of detergents is certainly not intended to be complete but merely illustrative of the numerous detergents which can find application within the scope of this invention.

The foregoing organic synthetic detergent compounds and the novel builder compounds of this invention can be formulated according to any of the several commercially desirable composition forms, for example, granular, flake, liquid and tablet form.

Granular detergent compositions according to one embodiment of this invention can contain a representative builder ingredient and a detergent active in the ratio of about 10:1 to about 1:3 by weight. The preferred ratio of builder ingredient to detergent active in a granular product is about 5:1 to about 1:2.

Another special embodiment of this invention is a liquid detergent composition also containing a builder ingredient and a detergent active in the ratio of about 10:1 to about 1:3. On the other hand, the preferred ratios and optimum detergency results with liquid compositions obtain when the builder ingredient and the detergent active are mixed in ratios by weight of about 3:1 to about 1:2, respectively. The potassium salt form of the builder compounds is usually preferred for use in built liquid compositions.

In a finished detergent formulation of this invention there can be added in minor amounts materials which make the product more effective or more attractive. The following are mentioned only by way of example. A soluble sodium carboxymethyl cellulose can be added in minor amounts to inhibit soil redeposition. A tarnish inhibitor such as benzotriazole or ethylenethiourea can also be added in amounts up to about 2 percent. Fluorescers, perfume, and color while not essential in the compositions of the invention, can be added in amounts up to about 1 percent. An alkaline material or alkali such as sodium hydroxide or potassium hydroxide can be added in minor amounts as supplementary pH adjusters. There might also be mentioned as suitable additives water, brightening agents, sodium sulfate, and sodium carbonate.

Corrosion inhibitors generally are added also. Soluble silicates are highly efficient inhibitors and can be added to certain formulas of this invention at levels of from about 3 percent to about 8 percent. Alkali metal, preferably potassium or sodium, silicates having a weight ratio of $SiO_2:M_2O$ of from 1.0:1 to 2.8:1 can be used. M in this ratio refers to sodium or potassium. A sodium silicate having a ratio of $SiO_2:Na_2O$ of about 1.6:1 to 2.45:1 is especially preferred for economy and effectiveness.

In the embodiment of this invention which provides for a built liquid detergent, a hydrotropic agent may at times be found desirable. Suitable hydrotropes are water soluble alkali metal salts of toluenesulfonate, benzenesulfonate, and xylenesulfonate. Preferred hydrotropes are the potassium or sodium toluenesulfonates. The hydrotrope salt may be added, if desired, at levels of 0 percent to about 12 percent. While a hydrotrope will not ordinarily be found necessary it can be added, if so desired, for any reason such as to produce a product which retains its homogeneity at a low temperature.

Three different performance characteristics of the new builder compounds were evaluated: cleaning, whiteness and whiteness maintenance. For the purposes of this invention, these terms have the following meanings. The term "cleaning" means the ability of a built laundering composition to remove deeply embedded soil lines or deposits such as occur at the collars and cuffs of white shirts. "Whiteness" is a more general term which is a measurement of the ability of a built laundering composition to whiten areas which are only slightly or moderately soiled. "Whiteness maintenance" is a term used to describe the ability of a laundering composition to prevent the soil, which has been removed during the washing process from being redeposited upon the fabrics during the remainder of the washing cycle. Test methods are described below.

One series of experiments which revealed the surprising efficiency of substituted ethane compounds of the present invention in "cleaning" characteristics as the term is defined in the preceding paragraph, involved the laundering of naturally soiled white dress shirts with detergent compositions built with different builder materials. Shirts with detachable collars were worn by male subjects under ordinary conditions. The collars and cuffs were then detached and laundered in a small agitator type washing machine using solutions of the detergent compositions to be evaluated for comparison purposes. The specific washing conditions are described below.

The washed and dried fabrics were then visually compared with other fabrics which had been similarly worn and soiled but which were washed with a standard detergent composition. This visual comparison was made by a group of five people who were unfamiliar with the structure and purpose of the test and who formed their judgments independently.

Their visual judgments were expressed on a scale ranging from zero to ten where zero represents the cleaning level obtained by washing with water alone and a value of ten represents the cleaning level of an excellent standardized detergent composition under optimum conditions. Scores intermediate zero and ten allow for relative comparisons to be made between the different compositions being evaluated.

The preceding procedure was followed using detergent compositions consisting solely of a detergent surfactant, and a builder compound. No fluorescers, bleaches, or antiredeposition agents were used to preclude any possible interference or masking over of the effectiveness of the respective builders used. The washing solutions containing seven grains (equivalent $CaCO_3$) per gallon hardness were adjusted with NaOH to a pH of 10 at a temperature of 140° F.

The builder used for comparative purposes was sodium tripolyphosphate, STP, which is widely used and readily available commercially. Tetrasodium dihydrogen ethane-1,1,2-triphosphonate was selected as a representative builder salt prepared according to this invention. The synthetic detergent compound used was dodecyl benzene sulfonate wherein the dodecyl radical was derived from tetrapropylene.

The usage level of the surfactant in the washing solution was at a concentration of .03 percent by weight. The concentration of the substituted ethane triphosphonate builder compound was also .03 percent. Data was obtained for sodium tripolyphosphate at .03 percent in order to have a comparison at equal usage levels. The sodium tripolyphosphate was also tested at 0.06 percent in order to determine how the compounds of this invention would compare to sodium tripolyphosphate when only one-half as much ethane-1,1,2-triphosphonate was used. The results were surprising, for they showed that ethane-1,1,2-triphosphonate offered a very considerable improvement over sodium tripolyphosphate at equal usage levels of 0.03 percent. The results also showed that ethane-1,1,2-triphosphonate at 0.03 percent substantially equaled the cleaning performance of sodium tripolyphosphate at 0.06 percent concentration. These results were not expected. Such favorable results are all the more surprising when one considers that both sodium tripolyphosphate and ethane-1,1,2-triphosphonate each have three atoms of phosphorous per each mole of compound and also that their molecular weights are quite similar, e.g., sodium tripolyphosphate 368, and tetrasodium dihydrogen ethane-1,1,2-triphosphonate 380. Based on these similar characteristics one would possibly be more likely to expect to see a parity of performance between equal concentrations of ethane-1,1,2-triphosphonate and sodium tripolyphosphate. The clear advantage of superior efficiency in favor of ethane-1,1,2-triphosphonate at the lower concentration levels of 0.03 percent as seen from the table II below, takes on added significance in this light.

TABLE II

| Detergent composition | Cleaning grade |
|---|---|
| Composition: | |
| A {.03% tetrapropylene benzene sulfonate / .03% sodium tripolyphosphate} | .7 |
| B {.03% tetrapropylene benzene sulfonate / .03% tetrasodium dihydrogen ethane-1,1,2-triphosphonate} | 4.9 |
| C {.03% tetrapropylene benzene sulfonate / .06% sodium tripolyphosphate} | 5.0 |

Each of the other substituted ethane compounds identified above which can be prepared according to the present invention perform in substantially the same relative manner, that is superiority over sodium tripolyphosphate at equal concentration of 0.03 percent and parity in performance between compositions wherein twice the concentration level of sodium tripolyphosphate, e.g., 0.06 percent, as compared to 0.03 percent concentration of ethane-1,1,2-triphosphonate.

The significance of these experimental results is that, as a result of this invention, it is now possible to use only one-half of the ordinary concentration of builder generally recommended for good laundering results without noticeably sacrificing cleaning performance.

Two of the groups of fabric cuff samples washed with the detergent compositions described in table II were also examined for "whiteness" results and the comparative values are presented in table III below.

Whiteness measurements were made on the backs of the naturally soiled cuffs with a commercially available photoelectric trichromatic colorimeter, i.e., a Hunter Color and Color Difference meter manufactured by Henry A. Gardner Laboratory, Inc. This instrument is designed to distinguish color differences and operates on the tristimulus colorimeter principle wherein the 45° diffuse reflectance of an incident light beam on a test specimen is measured through a combination of green, blue and amber filters. The electrical circuitry of the instrument is so designed that lightness and chromaticity values for the test specimen are read directly. The departure from white (MgO being taken as a standard white) of the test specimen is calculated by a calibrated weighting (i.e. calibrated previously against visual impressions of whiteness differences) of the lightness and chromaticity value so obtained. An evaluation of relative whiteness performance compared to a standard detergent composition is thus obtained for the test formulations. These are later compared with other values obtained from other test samples.

A more comprehensive description of this instrument and its mode of operation appears in Color in Business, Science and Industry, by Deane B. Judd, pages 260-262; published by John Wiley & Sons, New York, (1952).

TABLE III.—WHITENESS EVALUATION

| Detergent composition | | Measured values |
|---|---|---|
| Composition: | | |
| B | .03% tetrapropylene benzene sulfonate .03% tetrasodium dihydrogen ethane-1,1,2-triphosphonate. | +.37 |
| C | .03% tetrapropylene benzene sulfonate .06% sodium tripolyphosphate | .00 |

The whiteness figures presented above in table III illustrate the superior whiteness results obtained with the tetrasodium dihydrogen ethane-1,1,2-triphosphonate built composition. The higher figure of +0.37 indicates better whiteness levels, i.e., less departure from a standard white. It should be noted that the superior whiteness results which the above figures demonstrate on behalf of composition B were obtained with only one-half the builder concentration of ethane-1,1,2-triphosphonate, that is, a concentration of 0.03 percent ethane-1,1,2-triphosphonate as compared to 0.06 percent sodium tripolyphosphate in composition C. The value of 0.00 assigned to composition C is an extrapolation from the actual measurements, and while the figures are not significant in themselves, the ranking of the two different compositions is highly pertinent.

The whiteness maintenance evaluation was performed by the following method. Unsoiled swatches of cotton terrycloth were added to the collar and cuff samples which were washed according to the above cleaning and whiteness examples. The cotton swatches were thereafter independently evaluated to determine the whiteness maintenance property of the particular built laundering compositions. As mentioned above, soil carried by the cotton terrycloth swatches after the washing cycle represents soil which was removed from the soiled fabrics, suspended in the washing solution and redeposited on the fabrics. This type of soil redeposition is a serious matter and compositions offering improved results in this area are constantly being sought.

The same measuring procedure employing the Hunter Color and Color-Difference Meter was followed in this experiment as in the measurement of whiteness. Thus, the figures in table IV below are whiteness maintenance grades calculated from data obtained by grading the cotton terrycloths washed with the detergent compositions described above. Increasing values again represent better performance results.

TABLE IV.—WHITENESS MAINTENANCE EVALUATION

| Detergent composition | | Measured values |
|---|---|---|
| Composition: | | |
| B | .03% tetrapropylene benzene sulfonate .03% tetrasodium dihydrogen ethane-1,1,2-triphosphonate. | +.64 |
| C | .03% tetrapropylene benzene sulfonate .06% sodium tripolyphosphate | .00 |

The superior whiteness maintenance results obtained with composition B were again at the expense of composition C notwithstanding that the usage level or concentration of the builder in composition C was twice that of composition B again evidencing the remarkable efficiency of detergent composition built with builder compounds of the present invention. As pointed out above, the values of 0.00 for the sodium tripolyphosphate built composition C represents an extrapolation from actual measurements by the Hunter Color and Color-Difference Meter.

In a third detergency evaluation naturally soiled fabric swatches (desized cotton print cloth) were washed for 10 minutes in an aqueous solution having a temperature of 80° or 140° F. as specified in table V below. The washing solution had a pH ranging in different runs from 9.5, 10, 10.5 to 11.5, as spelled out in table V below. Seven grains equivalent CaCO$_3$ per gallon hardness were present in the washing solution. Again test compositions were prepared containing only the basic essentials according to the present invention, i.e. a detergent compound and a builder compound. The detergent compounds used were tetrapropylene benzene sulfonate and 3-(N,N-dimethyl,N-hexadecylammonio)propane-1-sulfonate. The concentration in solution was 0.03 percent by weight of the detergent and either 0.03 percent or 0.06 percent of the builder as seen from table V below.

In table V the several built detergent compositions tested are ranked according to their relative soil removing properties. Soil removal is expressed as a percentage of the soil originally present on the soiled swatches. A solvent extraction technique was used to determine the amount of soil present on the cloth swatches after washing and drying as well as on similarly soiled but unwashed swatches. Calculations with the data so obtained yielded the figures in table V.

It is pointed out that the benchmark figure for this set of runs is a tetrapropylene benzene sulfonate-sodium tripolyphosphate built composition tested at pH 10 and 140° F., or composition 5 in the table below.

TABLE V.—SOIL REMOVAL OF ORIGINAL SOIL ON SWATCHES

| Compositions: | | Col. 1 (1) | Col. 2 (2) | Col. 3 (3) |
|---|---|---|---|---|
| (1) | .03% tetrapropylene benzene sulfonate (pH 9.5; 140° F.) percent. | 48.6 | 51.5 | |
| (2) | .03% tetrapropylene benzene sulfonate (pH 10.5; 140° F.), percent. | 58.6 | 59.3 | |
| (3) | .03% 3-(N,N-dimethyl,N-hexadecylammonio)-propane-1-sulfonate, percent. | 59.2 | | |
| (4) | .03% 3-(N,N-dimethyl,N-hexadecylammonio)-propane-1-sulfonate, percent. | 65.8 | | |
| (5) | .03% tetrapropylene benzene sulfonate (pH 10; 140° F.), percent. | | | 55.8 |

1 .03% tetrasodium dihydrogen ethane 1,1,2-triphosphonate.
2 .06% tetrasodium dihydrogen ethane 1,1,2-triphosphonate.
3 .06% sodium tripolyphosphate.

It will be noted that the test results presented in the table above, confirm the previously described performance results which show the marked efficiency of tetrasodium dihydrogen ethane-1,1,2-triphosphonate as a builder at the lower concentration of 0.03 percent. In combination with tetrapropylene benzene sulfonate at 0.03 percent, pH 9.5 and 140° F. (composition 1), and also with tetrapropylene benzene sulfonate at 0.03 percent, pH 10.5 and 140° F. (composition 2), tetrasodium dihydrogen ethane-1,1,2-triphosphonate at 0.03 percent (column 1) performs equally as well as sodium tripolyphosphate does at double the concentration or at 0.06 percent, pH 10 and 140° F. (Composition 5 and column 3). At equal concentrations of 0.06 percent tetrasodium dihydrogen ethane-1,1,2-triphosphonate (column 2) and 0.06 percent sodium tripolyphosphate (column 3) perform equally well with the same detergent active. The percentages for compositions 1 and 2 average 55.4 percent which is not significantly different from 55.8 percent for the sodium tripolyphosphate built-composition 5.

The following compositions, in which the percentages are by weight, will serve to illustrate but not limit this invention. The compositions in the examples should be used for best results in a solution having a pH within the desired range of from about 8 to about 12. This may in some instances require supplementary amounts of the alkaline materials mentioned above as pH adjusters.

TABLE VI.—DETERGENT COMPOSITIONS [1]

| | Anionic | | | | | | | | | Nonionic | | | | | Ampholytic | | Zwitter-Ionic | |
|---|---|---|---|---|---|---|---|---|---|---|---|---|---|---|---|---|---|---|
| | Sodium tallow alkyl sulfate | Dodecylbenzene sulfonate (straight chain ABS) | Dodecylbenzene sulfonate (dodecyl-derived from tetrapropylene) | Potassium C10–C18 glyceryl ether sulfonate | Olefin sulfonate containing C10–C16 alkyl radical | Tetrasodium N-(1,2-bicarboxyethyl)-N-octadecyl sulfosuccinamate | Sodium salt of sulfonated alkylphenoxypoly(ethyleneoxy)ethanol | Sodium salt of a 1:1 mixture of coconut and tallow soap | Dodecylphenol ethylene oxide condensate containing 10 moles of ethylene oxide | Dodecyldimethyl phosphine oxide | Dodecyldimethyl amine oxide | A coconut alcohol ethylene oxide condensate [2] | Hexadecyldimethyl amine oxide | Tetradecyldiethyl phosphine oxide | Sodium-3-dodecylamino propionate | Potassium-3-dodecylamino-propane sulfonate | 3-(N,N-dimethyl-N-hexadecyl ammonio) propane-1-sulfonate | 3-(N,N-dimethyl-N-hexadecyl ammonio)-2-hydroxy propane-1-sulfonate |
| Example: | | | | | | | | | | | | | | | | | | |
| 1 | | 50 | | | | | | | | | | | | | | | | |
| 2 | 30 | | 50 | | | | | | | | | | | | | | | |
| 3 | | | | | 30 | | | | | | | | | | | | | |
| 4 | | | | | | | 30 | | | | | | | | | | | |
| 5 | | | | | | | | | | | | | | | | | | |
| 6 | | | | | | 10 | | 20 | | | | | | | | | | |
| 7 | 30 | | | | | | | | 40 | | | | | | | | | |
| 8 | | | | | | | | | | 30 | | | | | | | | |
| 9 | | | | | | | | | | | | | 70 | 45 | | | 30 | |
| 10 | | | | | | | | | | | | 25 | | | | 45 | | |
| 11 | | | | | | | | | | | 34 | | | | 35 | | | |
| 12 | | | | | | | | | | | 25 | | | | | | | |
| 13 | | | | 66 | | | | | | | | | | | | | | |
| 14 | | | | | | 15 | | | | | | | | | | | | |
| 15 | | | | 66 | | | | | | | | | | | | | | |
| 16 | | | | | | | | | | | | | | | | | 50 | |
| 17 | | | | | | | | | | | | | | | | | | 50 |
| 18 | | | | | | | | | | | | | | | | | | 25 |

[1] Percentages and ratios are by weight.
[2] Having from about 5 to about 30 moles of ethylene oxide per mole of coconut.

Table VI—Continued

| Example | Trisodium trihydrogen 1,2-tri-ethane-1, phosphonate | Tetrasodium dihydrogen 1,2-tri-ethane-1, phosphonate | Pentasodium hydrogen 1,2-tri-ethane-1, phosphonate | Tripotassium trihydrogen 1,2-tri-ethane-1, phosphonate | Tetrapotassium dihydrogen 1,2-tri-ethane-1, phosphonate | Triammonium trihydrogen 1,2-tri-ethane-1, phosphonate | Tetraammonium dihydrogen 1,2-tri-ethane-1, phosphonate | Ratio of builder to active |
|---|---|---|---|---|---|---|---|---|
| 1 | 50 | | | | | | | 1:1 |
| 2 | | 50 | | | | | | 1:1 |
| 3 | | 70 | | | | | | 1:1.5 |
| 4 | | | 40 | | | | | 1:1.5 |
| 5 | | | | 90 | | | | 2.3:1 |
| 6 | | | | | 80 | | | 9:1 |
| 7 | | | | | | 60 | | 4:1 |
| 8 | | | | | | | 40 | 1.5:1 |
| 9 | 65 | | | | | | | 1:1.5 |
| 10 | | 55 | | | | | | 1:2.3 |
| 11 | | | | 75 | | | | 1:3 |
| 12 | 34 | | 66 | | | | | 1.8:1 |
| 13 | | | | | | 25 | | 1.2:1 |
| 14 | | 85 | | | | | | 3:1 |
| 15 | 50 | | | | | | | 2:1 |
| 16 | | 50 | | | | | | 1:2 |
| 17 | | | | | | | 30 | 5.7:1 |
| 18 | | | | | | | | 1:1 |

The foregoing description of the invention has been presented describing certain operable and preferred embodiments. It is not intended that the invention should be so limited since variations and modifications thereof will be obvious to those skilled in the art, all of which are within the spirit and scope of this invention.

What is claimed is:

1. A process of treating aqueous solutions containing polyvalent metal ions which consists of adding to said solution an effective amount of a sequestering compound having the following general formula:

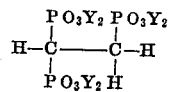

in which the Y substituent is selected from the group consisting of hydrogen, sodium, potassium, ammonium, ammonium substituted with lower alkyl radicals containing less than seven carbon atoms and lower hydroxyalkyl radicals containing less than seven carbon atoms.

2. A process of treating aqueous solutions according to claim 1 in which the amount of sequestering compound added is in the range of from 0.25 to 10,000 p.p.m. of the aqueous solution.

* * * * *